73-629 SR

XR 3,856,985

United States

Yokoi et al.

[11] 3,856,985

[45] Dec. 24, 1974

[54] ULTRASONIC DIAGNOSTIC APPARATUS

[75] Inventors: Hiromj Yokoi, Osaka; Kenichi Ito, Yokohama; Kenji Mizobuchi, Tokyo, all of Japan

[73] Assignees: Tokyo Shibaura Electric Co., Ltd., Kawasaki-shi; Tokyo Electronic Industry Co., Ltd., Tokyo, both of, Japan

[22] Filed: May 17, 1973

[21] Appl. No.: 361,044

[52] U.S. Cl. ........... 178/6, 178/DIG. 18, 73/67.8 H, 73/69, 178/2 V

[51] Int. Cl. ........................................... H04m 7/18

[58] Field of Search ...... 178/6, DIG. 18; 73/67.5 H, 73/67.8, 67.9, 69; 128/2 V

[56] References Cited

UNITED STATES PATENTS 3,690,311 9/1972 Schorum et al. .................... 128/2 V 3,792,194 2/1974 Wood ................................ 178/6.8

*Primary Examiner*—Robert L. Griffin

*Assistant Examiner*—Edward C. Coles

*Attorney, Agent, or Firm*—Flynn & Frishauf

[57] ABSTRACT

The ultrasonic diagnostic apparatus comprises an ultrasonic wave transducer for transmitting an ultrasonic wave toward an object to be examined and for producing an electric signal corresponding to the ultrasonic wave reflected by the object, a receiver connected to receive the electric signal from the transducer for producing an image signal, an analogue-digital converter for converting the image signal into a digital signal suitable for a B-scope display, a data buffer for storing the output from the converter and means responsive to the output from the data buffer for displaying a B-scope image of the object on a television picture tube.

36 Claims, 13 Drawing Figures

3856985 OR IN 178/6

ULTRASONIC DIAGNOSTIC APPARATUS

BACKGROUND OF THE INVENTION

This invention relates to ultrasonic diagnostic apparatus in which an image signal corresponding to the ultrasonic wave reflected by an object to be examined (hereinafter termed as a patient) is digitally stored and the stored signal is then displayed as a picture on a television picture tube.

Among various methods of ultrasonic diagnosis, ultrasonic tomography can best fulfil the requirements of modern diagnosis. According to this method the patient is scanned with an ultrasonic wave pulse so as to obtain tomographs of the patient.

With the prior art ultrasonic tomography, when the patient is scanned with an ultrasonic wave generated by an ultrasonic wave transducer it is possible to provide only a tomogram in which portions above a given level are displayed with a brightness different from other portions so that such tomogram does not provide sufficient information necessary for the diagnosis. For this reason, images of high resolutions are formed by providing images at different levels of the patient by repeating the scanning operation at respective levels or by superposing images at different levels to obtain a single composite image. However, it is difficult to produce accurate images due to misalignment of the positions of the patient and the ultrasonic wave transducer, or the variations in the position and speed at which the ultrasonic wave transducer is actuated. Especially, when the scanning by the transducer is effected manually, it is impossible to provide images at different levels at the same position by a number of scanning operations. In addition, as such operation requires much time such diagnosis can not be made efficiently.

SUMMARY OF THE INVENTION

Accordingly, it is an object of this invention to provide an improved ultrasonic diagnostic apparatus capable of producing accurate tomograms of the patient in a short time.

A further object of this invention is to provide a novel ultrasonic diagnostic apparatus capable of producing tomograms of the patient as white and black or color television picture images of high contrasts.

Still further object of this invention is to provide an ultrasonic diagnostic apparatus capable of enlarging or reducing the area under diagnosis.

In accordance with this invention, these and further objects can be accomplished by providing an ultrasonic diagnostic apparatus of the type including an ultrasonic wave transducer for transmitting an ultrasonic wave toward an object to be examined and for converting the ultrasonic wave reflected by the object into an electric signal, and means responsive to the electric signal for displaying the image of the object, characterized in that there are provided means for energizing the ultrasonic wave transducer, means for moving the transducer along the object, means for producing a position signal representing the position of the transducer, a receiver for receiving the output signal from the transducer, an analogue-digital converter for converting the output from the receiver into a digital signal, a data buffer for storing the output from the converter, a line buffer for temporarily storing data of the quantity corresponding to one horizontal scanning line of a television set, said data being read out from the data buffer, means for converting the output signal from the line buffer into a signal suitable to be displayed on the television set, and means responsive to the output from the signal converting means for displaying the image of the object.

DESCRIPTION OF THE PREFERRED EMBODIMENTS

Figure 1:
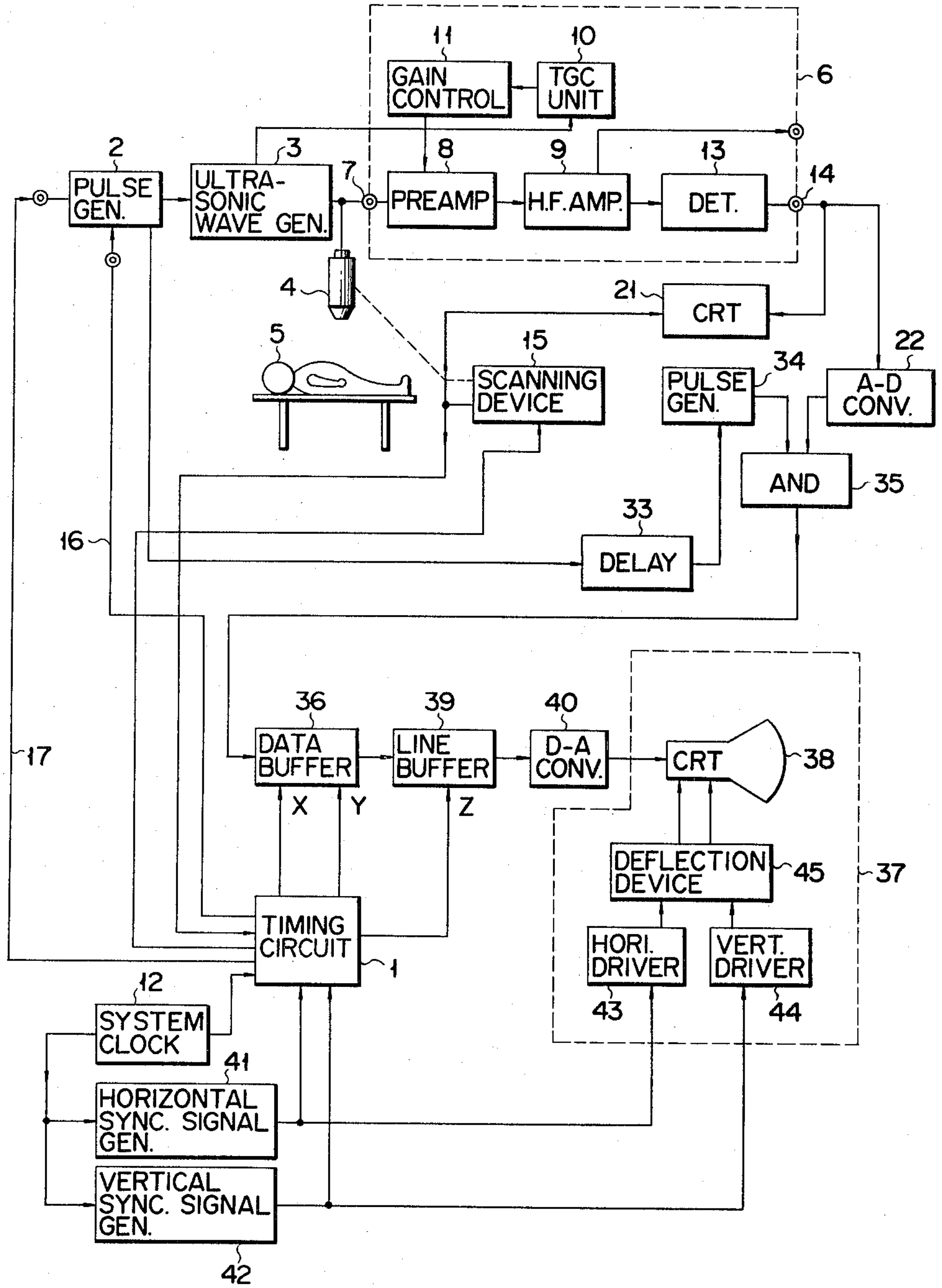
FIG. 1 shows a block diagram of one embodiment of this invention.

In the embodiment shown in FIG. 1 a trigger signal produced by a timing circuit 1 is sent to a pulse generator 2 to produce a pulse signal corresponding to the frequency of the input trigger signal. The pulse signal generated by pulse generator 2 is applied to an ultrasonic wave generator 3 to produce an ultrasonic wave having a frequency of 1 MHz to 10 MHz, for example. The ultrasonic wave energy produced by the ultrasonic wave generator 3 is applied to an ultrasonic wave transducer 4 in the form of a probe to be radiated toward a patient 5. The ultrasonic wave reflected by the patient 5 is received again by the ultrasonic wave transducer 4 and converted thereby into an electric signal, which is impressed upon an input terminal 7 of a receiver 6. The input signal received by the input terminal 7 is applied to a preamplifier 8 and the output thereof is applied to a high frequency amplifier 9. The gain of the preamplifier 8 is controlled by a gain controller 11 which, in turn, is controlled by the output from a time gain compensation (TGC) unit 10. In the case where the body of the patient 5 is homogeneous, the wave reflected by a level in the patient 5 positioned close to the transducer 4 has larger energy than the wave reflected by another level in the body of the patient 5 which is remote from the transducer 4. As a consequence, where the body of the patient 5 is homogeneous, the time gain compensation unit 10 is used for the purpose of generating electrical signals of a definite magnitude irrespective of the distance between the reflecting levels and the transducer 4. More particularly, the output pulse from the ultrasonic wave generator 3 is applied to the time gain compensation unit 10 to control the gain controller 11 such that the preamplifier 8 will have a minimum gain at the instant when the ultrasonic wave pulse is transmitted and that the gain of the preamplifier will be increased gradually thereafter. Since the time gain compensation unit 10 is well known in the art it is believed unnecessary to describe it in detail.

The timing circuit 1 is connected to receive the clock signal generated by a system clock signal generator 12 to produce a signal having a plurality of predetermined frequencies. The timing circuit 1 may be constituted by various combinations of frequency dividers and frequency multipliers. The output from the high frequency amplifier 9 is detected by a detector 13 to produce an image signal at an output terminal 14 of receiver 6.

As shown by a dotted line, the ultrasonic wave transducer 4 is mechanically interlocked with a scanning device 15 such that the transducer 4 is moved at a definite speed and in a predetermined direction across the surface of the patient 5. As the transducer 4 is moved in this manner, a position signal is generated which is supplied to timing circuit 1, and this circuit supplies to pulse generator 2 a gate signal which is synchronized with the position signal over a conductor line 16. Consequently, the pulse generator 2 is supplied with a trigger signal synchronized with the gate signal over a conductor line 17 for driving the ultrasonic wave generator 3.

Figures 2, 5:
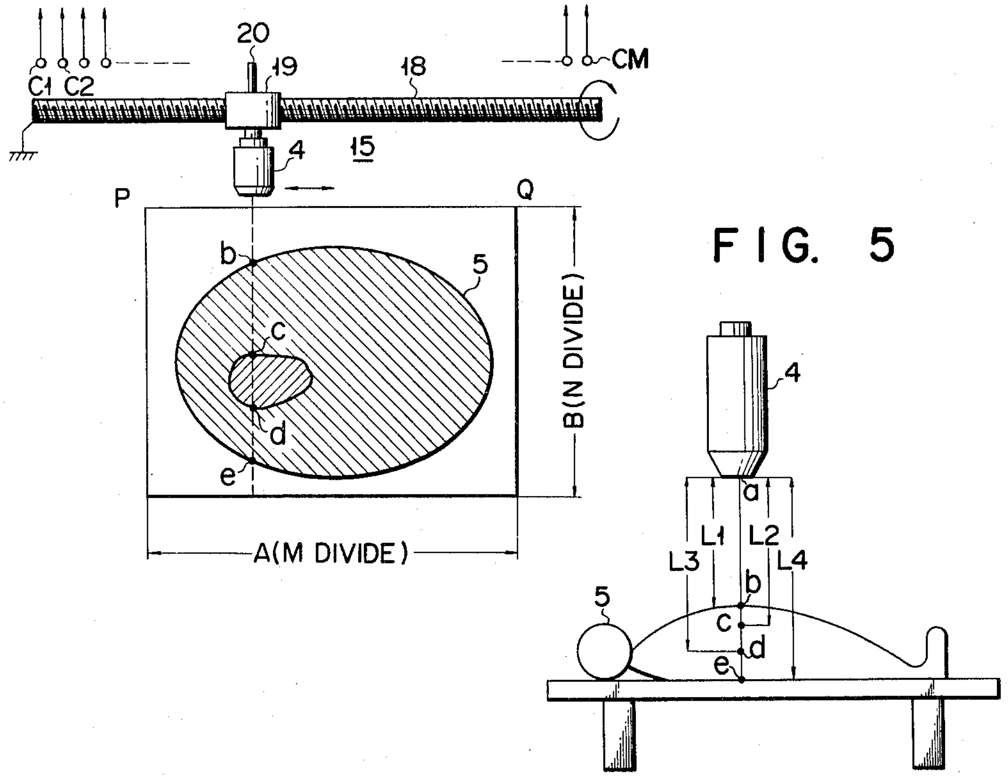
FIG. 2 is a diagrammatic representation of one example of the scanning device utilized in the embodiment shown in FIG. 1.
FIG. 5 is a diagram showing the relationship between the positions of a patient and of an ultrasonic wave transducer.

As shown in FIG. 2, the scanning device 15 includes a threaded shaft 18 driven by an electric motor, not shown. The threaded shaft 18 has a length sufficient to cover a scanning area extending from point P to point Q in which the patient 5 is contained. In FIG. 2, the cross-section of the patient 5 is shown at the scanning position shown in FIG. 1 and according to this invention a tomographic image in this cross-section is displayed on the fluorescent screen of a television picture tube. The threaded shaft 18 carries an internally threaded support 19 which is used to support ultrasonic wave transducer 4 directed to the patient 5 and a contact piece 20 for detecting positions. A plurality of equally spaced apart stationary contacts C1, C2, ... CM are provided along threaded shaft 18 to be successively engaged by contact piece 20 which is moved together with the transducer 4. One end of the threaded shaft 18 is grounded while contacts C1, C2, ... CM are connected to a suitable electric source, not shown, so as to produce position signals at respective contacts C1, C2, ... CM corresponding to the position of the transducer 4.

Position signals produced in this manner by the scanning device 15 are applied to timing circuit 1 and also to a cathode ray tube 21 to act as scanning signals so that an image of the patient 5 of the A-scope system is displayed on the fluorescent screen of the cathode ray tube 21 corresponding to the image signal supplied thereto from output terminal 14.

Figure 3:
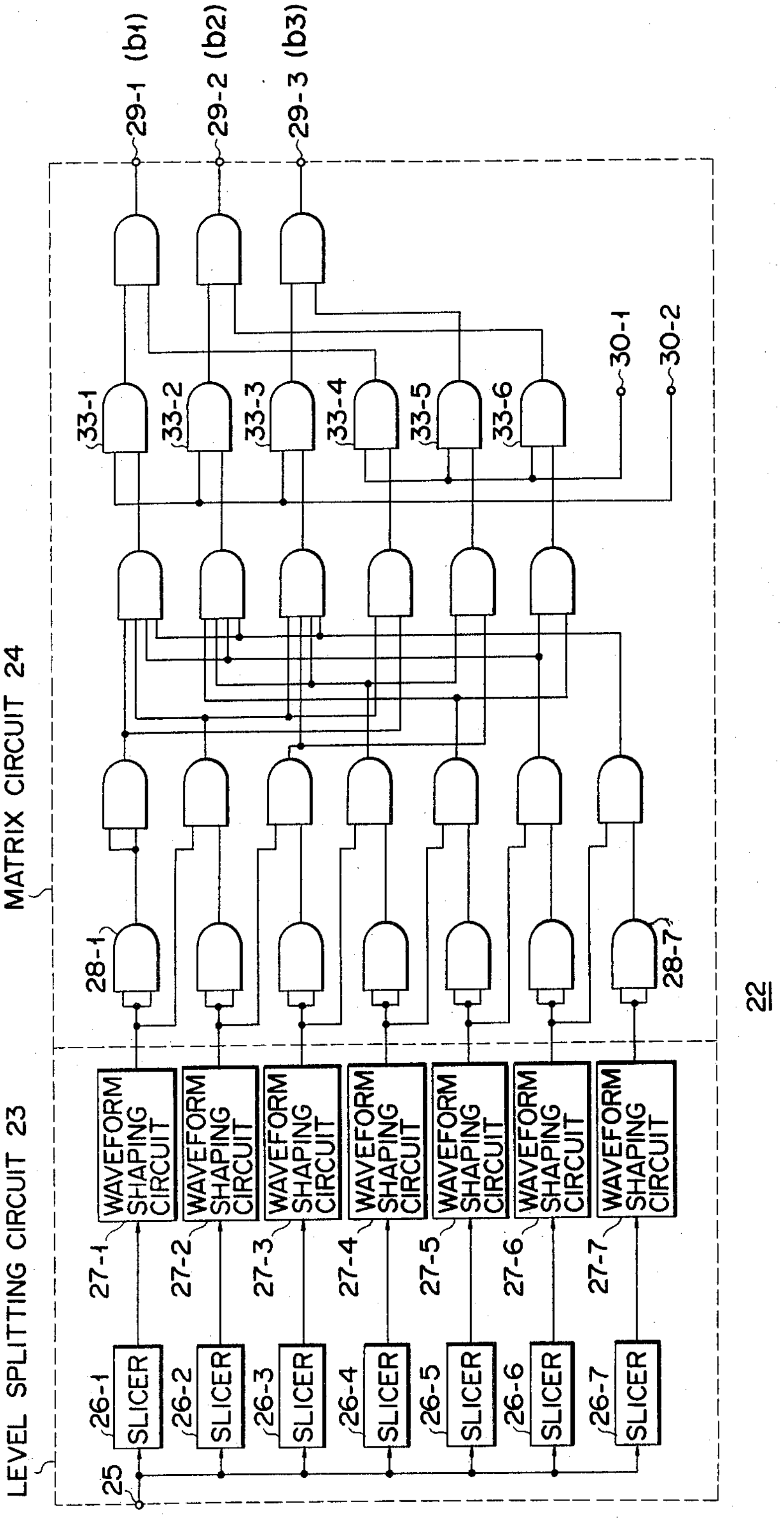
FIG. 3 is a block diagram showing the detailed connection of the analogue-digital converter utilized in the circuit shown in FIG. 1.

The image signal from output terminal 14 of receiver 6 is also applied to an analogue-digital converter 22 in which the analogue image signal is converted into a three bit digital signal, for example. FIG. 3 shows one example of the analogue-digital converter 22 which comprises a level splitting circuit 23 and a matrix circuit 24. The output image signal from output terminal 14 shown in FIG. 1 is applied to an input terminal 25 of the level splitting circuit 23. The image signal supplied to input terminal 25 is applied to seven parallel connected slicer circuits 26-1, 26-2 ... 26-7 which are set at different levels. Assuming a maximum amplitude of 1 volt for the image signal, the slicer circuit 26-1 is constructed to detect a voltage ranging from 0.875 V to 1 V (see FIG. 4) and slicer circuit 26-2 a voltage ranging from 0.75 to 0.875 V. The remaining slicer circuits 26-3 to 26-7 are constructed to detect voltages in the ranges of 0.625 to 0.75 V ... 0.125 to 0.25 V, respectively. Since a voltage in the range of from 0 V to 0.125 V can be detected by the fact that none of the slicer circuits produces an output so that the slicer circuit for this voltage range can be omitted.

Figure 4:
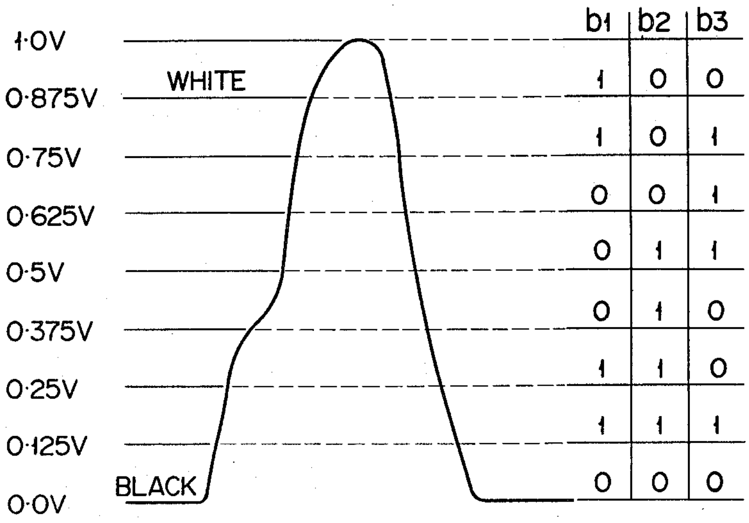
FIG. 4 is a graph helpful to explain the operation of the analogue-digital converter shown in FIG. 3.

Outputs from respective slicer circuits 26-1 to 26-7 are applied to respective wave shaping circuits 27-1 to 27-7 and the outputs from these wave shaping circuits are supplied to respective AND gate circuits 28-1 to 28-7 in the first stage of the matrix circuit 24, which functions to convert analogue output signals of seven slicer circuits 26-1 to 26-7 into three bit digital signals which appear on terminals 29-1, 29-2 and 29-3. The binary states of the output bits b1, b2 and b3 for respective levels are shown in FIG. 4. Where outputs *b*1, *b*2 and *b*3 are 1, 0 and 0 respectively, a white picture will be displayed on the screen of the television picture tube whereas when the output bits are 0, 0 and 0 respectively a black picture will be displayed. Between white and black, gray pictures whose tones vary stepwisely in accordance with the states of the output bits will be displayed. Two terminals 30-1 and 30-2 provided for the matrix circuit 24 are used to switch the tone of the picture. For example, where the terminal 30-1 is produced and the terminal 30-2 is impressed with a voltage of +5 volts, for example, AND gate circuits 31-1, 31-2 and 31-3 are enabled to apply all signals *b*1, *b*2 and *b*3 upon terminals 29-1, 29-2 and 29-3 respectively thus enabling to display the image with any one of eight different tones including white and black. On the other hand where terminal 30-1 is impressed with a voltage of +5 v and the terminal 30-2 is grounded, AND gate circuits 31-4, 31-5 and 31-6 are enabled to apply upon terminals 29-1, 29-2 and 29-3 special combinations of bits which display a predetermined tone alone among eight tones. Although in this example the analogue output signals from seven slicer circuits 26-1 to 26-7 are converted into three bit digital signals, it will be clear that it is possible to improve the fineness of the displayed picture by increasing the number of bits.

As diagrammatically shown in FIG. 5, the ultrasonic wave radiated by the ultrasonic wave transducer 4 is reflected by the patient 5 at various portions *b, c, d* and *e* and the reflected waves are received by the transducer 4 and are converted into electric signals. The portions b and e are on the outer surface of the patient and the portions c and d are on the outer surface of a diseased part, as shown in FIG. 2. Let us denote the distances between the tip of the transducer 4 from which the ultrasonic wave is emanated and respective portions *b, c, d* and *e* at which the wave is reflected by L1, L2, L3 and L4, respectively. By denoting the mean velocity of propagation of the ultrasonic wave by $v$ cm/sec, the intervals T1, T2, T3 and T4 in which the radiated wave is reflected at respective portions b, c, d and e and returns to the chip a of the transducer 4 are expressed respectively by $T1 = 2L1/v$, $T2 = 2L2/v$, T3

Figure 6:
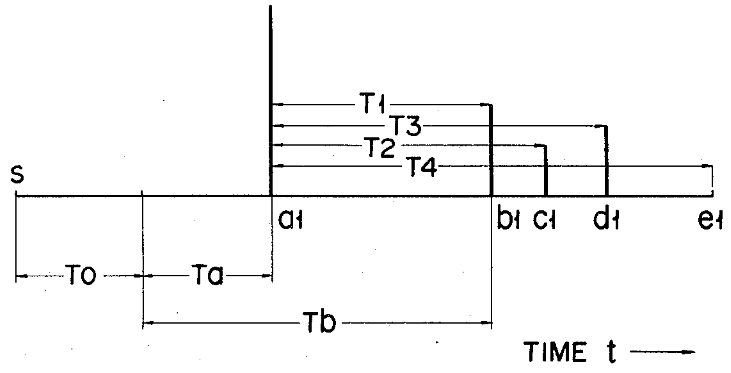
FIG. 6 is a graph showing the waveform of electric signals produced by the transducer shown in FIG. 5.

= 2L3/v and T4 = 2L4/v. The waveforms of such reflected ultrasonic waves take the forms shown in FIG. 6 when they are displayed on cathode ray tube 21. In FIG. 6, the abscissa represents the time, and the waveforms shown in FIG. 6 are termed as A-scope in the art of ultrasonic wave diagnosis. Points *a*1, *b*1, *c*1, *d*1 and *e*1 on the abscissa correspond to portions *a* to *e* respectively shown in FIG. 5. The ordinate of FIG. 6 designates the intensity of the reflected wave at each point. For example, when it is assumed that L1 = 5 cm, L2 = 6 cm, L3 = 12 cm, L4 = 15 cm and v = 1500 m/sec = 150,000 cm/sec, then T1 = 2L1/v = 66.6 μsec.
T2 = 2L2/v = 80 μsec.
T3 = 2L2/v = 160 μsec.
T4 = 2L4/v = 200 μsec.

Suppose now that the transducer 4 transmits the ultrasonic wave at an instant which is later than an instant S at which pulse generator 2 shown in FIG. 1 receives a start signal from timing circuit 1 over conductor line 16 by an interval T0, after an interval T*a* the wave reflected by the tip *a* will be detected by the transducer 4 and only after an interval T*b* the wave reflected by the upper surface b of the patient will be detected. For this reason, in order to display the region *b–e* (FIG. 2) of the patient which is to be diagnosed over the full scanning range B extending in the direction of the depth of the patient 5 and divided into N sections, it is necessary to take data at respective instants obtained by dividing the difference between T4 and T1 (see FIG. 4) with N.

This can be accomplished by providing a delay circuit 33, a pulse generator 34 and an AND gate circuit 35 for the circuit shown in FIG. 1. With these elements, the output fron the pulse generator 2 appears prior to the three bit signals *b*1, *b*2 and *b*3 from the analogue-digital converter 22 by an interval T0 (see FIG. 6) so that the output signal from pulse generator 2 is delayed by T0 in delay circuit 33 and the delayed signal is then supplied to pulse generator 34. Since interval T0 is not always constant it is advantageous to use a variable time delay circuit as the delay circuit 33 to deal with such variable interval. The output from variable delay circuit 33 is applied to a pulse generator 34 which generates N pulses in an interval of (T4 – T1), that is at a frequency of T4—T1/N. These pulses are applied to one input of an AND gate circuit 35. To the other input of the AND gate circuit is applied the digital image signal from analogue-digital converter 22 so that the digital image signal is sampled by the AND gate circuit 35 which is supplied with N gate pulses, and the sampled signal is applied to a data buffer 36 consisting of a dynamic shift register, for example. Pulse generator 34 operates to generate pulses having a frequency of a definite ratio with respect to the output frequency of pulse generator 2 and may be constituted by an ordinary pulse oscillator, frequency divider or a frequency multiplier.

Figure 7:
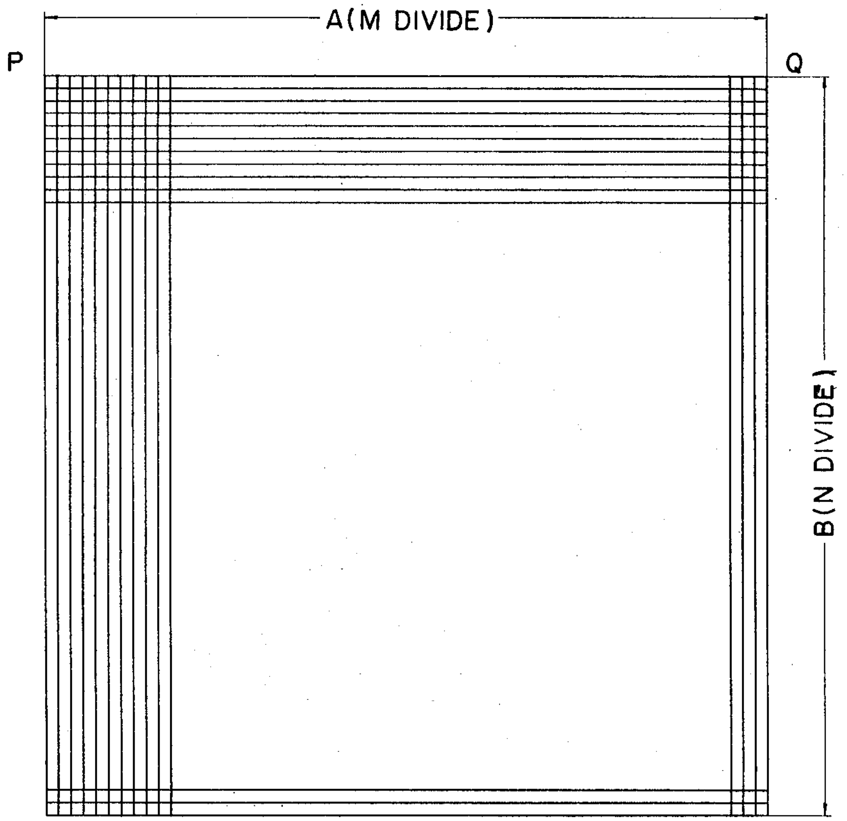
FIG. 7 shows the fluorescent screen or display surface of the cathode ray tube shown in FIG. 1.

Actually, the data duffer 36 is a memory device having M × N memory addresses as shown in FIG. 7. Where M = N = 64, a total of 64 × 64 = 4096 three bit data can be stored in this memory device 36. The data buffer 36 is supplied from timing circuit 1 with a clock signal X and an address designating signal Y in the directions A and B in accordance with the outputs from pulse generators 2 and 34 so that the digital image signal from analogue-digital converter 22 which has been sampled by the AND gate circuit 35 is regularly written in the predetermined address of the data buffer 36. When necessary, the digital image signal sent to data buffer 36 also can be written in a magnetic tape for later use in the diagnosis.

To display the data stored in the data buffer 36 on a cathode ray tube 38 of the type utilized in a television receiver 37, the clock signal X and the address designating signal Y are again applied to data buffer 36 from timing circuit 1. Accordingly, the data from data buffer 36 of the quantity corresponding to one horizontal scanning line of the television receiver are temporarily stored in a line buffer 39 and are then applied to a digital-analogue converter 40 under the control of a read out signal Z from timing circuit 1. The digital-analogue converter 40 functions to convert the digital image signal into an analogue signal such that when input bit signals *b*1, *b*2 and *b*3 are 1, 0 and 0 respectively a white picture is displayed, and when input bit signals are 0, 0 and 0 a black picture is displayed, whereas when the bit signals assume different states, pictures whose tones are varied stepwidely are displayed as has been described in connection with FIG. 4. In this manner, image signals for varied tones are impressed upon an electron gun (not shown) of the cathode ray tube 38.

Figure 8:
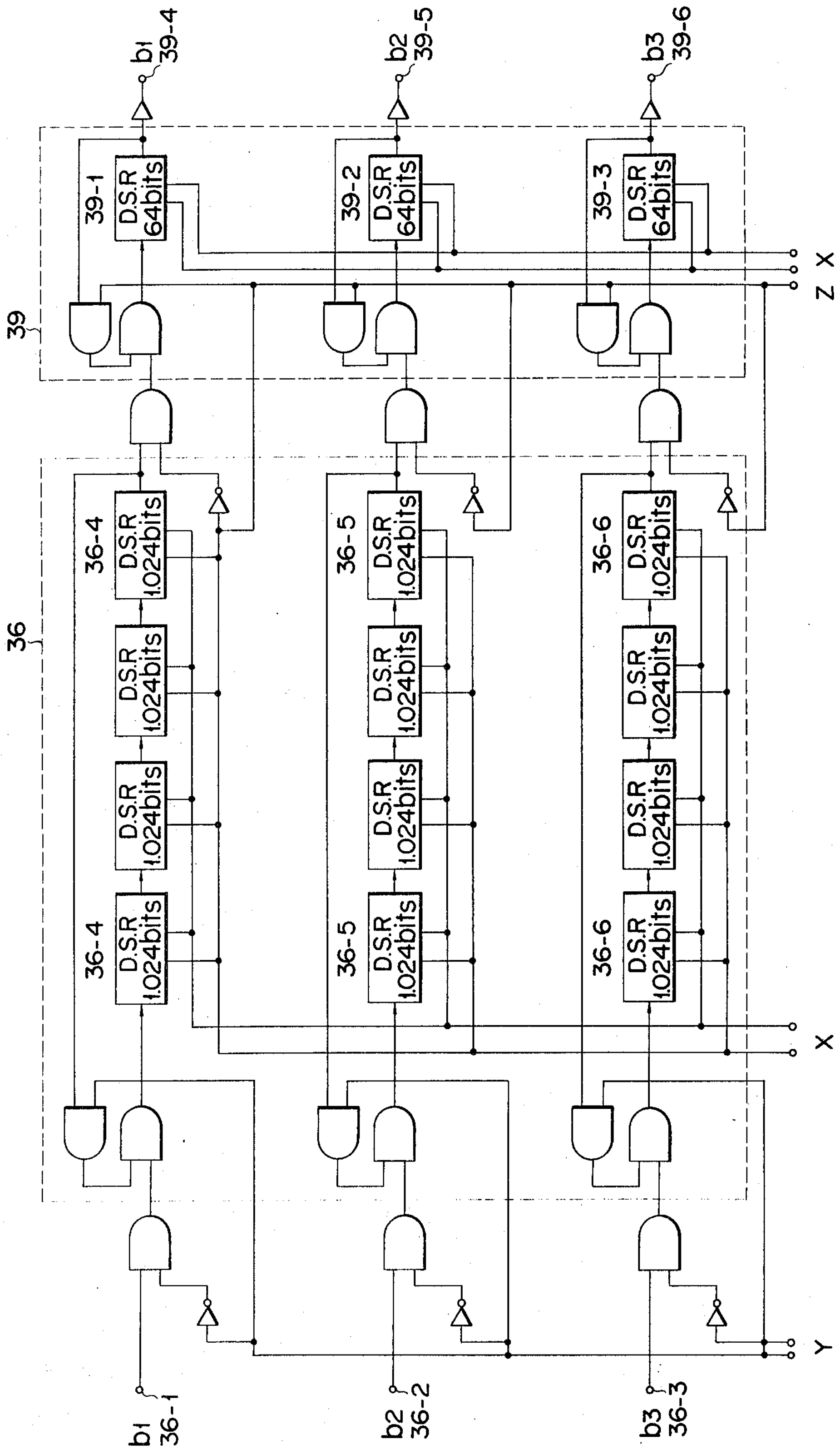
FIG. 8 is a block diagram showing one example of the data buffer utilized in the circuit shown in FIG. 1.

The data buffer 36 and line buffer 39 may be constituted by dynamic shift registers, as shown in FIG. 8. The three bit digital image signals *b*1, *b*2 and *b*3 from AND gate circuit 35 are applied to dynamic shift registers 36-4, 36-5 and 36-6 (each having memory capacity of 1024 bits, for example) respectively in the first stage via input terminals 36-1, 36-2 and 36-3 and two stage AND gate circuits, respectively. Respective image signals *b*1, *b*2 and *b*3 are successively stored in the circuits respectively including four serially connected dynamic shift registers 36-4, 36-5 and 36-6. The outputs from the dynamic shift registers in the end stage are fedback to the dynamic shift registers 36-4, 36-5 and 36-6 respectively in the first stage whereby the image signals are stored cyclically. The circulating speed of such a circulation memory circuit is different for the write-in mode and the read out mode. As can be noted from the foregoing description, during the read out mode, the circulating speed is synchronized with the scanning speed of a television set under the control of signal Y.

The outputs from dynamic shift resisters 36-4, 36-5 and 36-6 in the end stage are sent under the control of signal Z to three dynamic shift registers 39-1, 39-2 and 39-3 (each having a memory capacity of 64 bits) which constitute the line buffer 39. These dynamic shift registers 39-1 to 39-3 are provided with feedback loops to act as circulating memory circuits and their output terminals 39-4, 39-5 and 39-6 provide an image signal corresponding to one horizontal scanning line.

Figure 9:
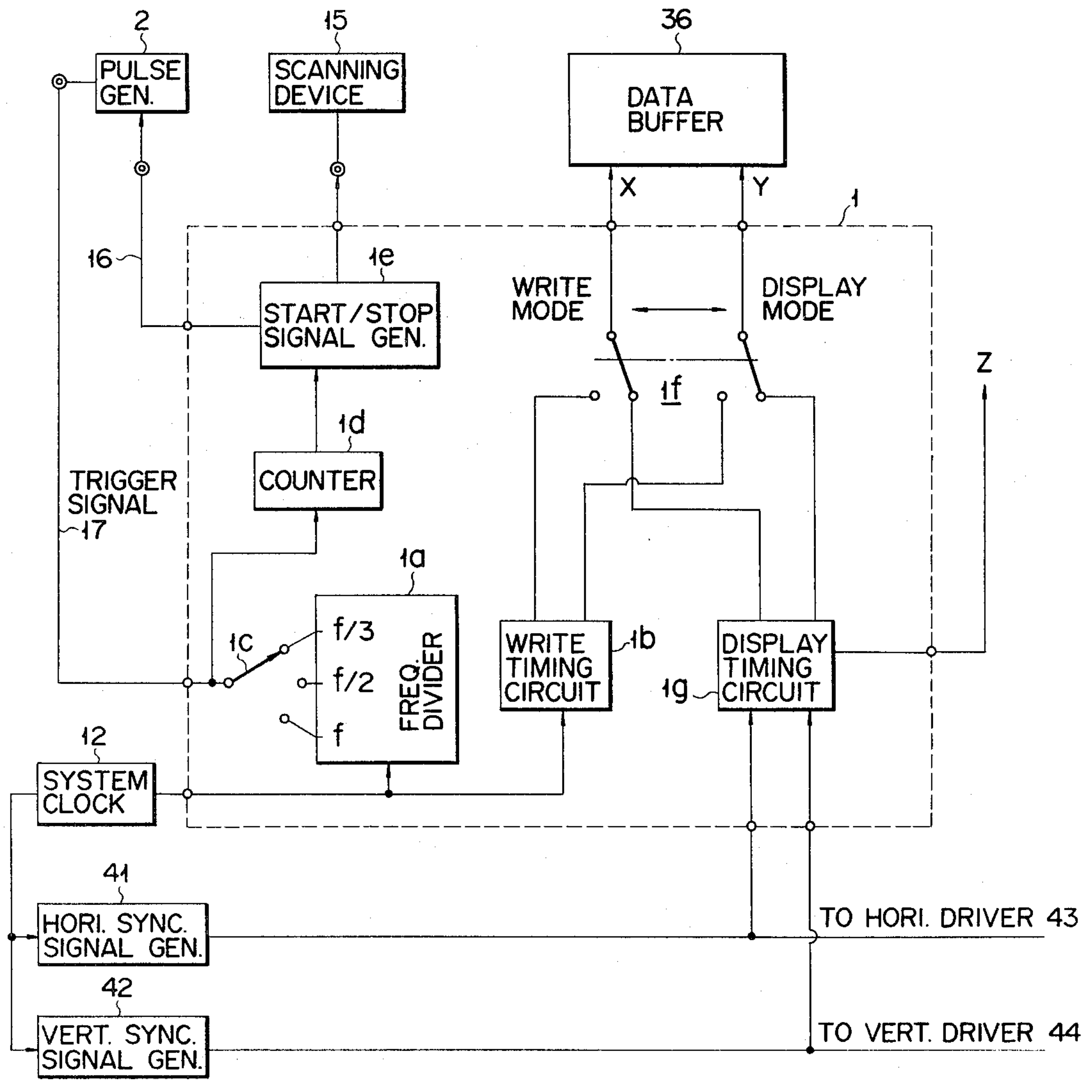
FIG. 9 is a block diagram showing one example of the timing circuit utilized in the circuit shown in FIG. 1.

There will now be described by reference to FIG. 9 the concrete arrangement of the timing circuit 1 of FIG. 1. The system clock generator 12 supplies a system clock signal having a frequency *f* to a frequency divider 1*a* for generating a trigger signal and a write timing circuit 16 for controlling the rate at which the digital image is stored in the data buffer 36. The frequency divider 1a produces trigger signals having different frequencies, for example, *f*, *f*/2 and *f*/3 according to the size of the areas of the patient 5 scanned by the transducer 4. These trigger signals are selectively conducted to the pulse generator 2 from the line 17 through the rotary switch 1*c*. The patient 5 is scanned by the transducer 4 at a fixed speed, so that unless the number of blocks M changes pulses have to be delivered from the pulse generator 2 at a doubled interval for scanning a doubled area, making it necessary to decrease the frequency of a trigger signal by half. For example, where a trigger signal has a frequency $f$ and scanning is effected with a width of 10 cm, then the pulse generator is supplied with trigger signals which have a frequency $f/2$ for a scanning width of 20 cm and a frequency $f/3$ for a scanning width of 30 cm.

An output signal from the frequency divider 1*a* is delivered from the rotary switch 1*c* through the counter 1*d* to the start-stop signal generator 1*e*. The counter 1*d* counts pulse signals from the frequency divider 1*a* and supplies a carry signal to the start-stop signal generator 1*e* when the counted number reaches the prescribed amount. The counted number remains fixed independently of changes in the scanning width. Therefore, the more increased the scanning width, the longer the time required for a carry signal to be generated. Namely, said time will be 2.3 seconds, 4.6 seconds and 6.9 seconds for the scanning widths of 10 cm, 20 cm and 30 cm. The start-stop signal generator 1*e* supplies a start signal to the scanning device 15, the moment the counter 1*d* commences counting, and generates a stop signal upon receipt of a carry signal. Further, the start-stop signal generator 1*e* delivers a gate signal to the pulse generator 2 through the signal line 16. The start and stop signals may be supplied to the date buffer 36 to control its operation instead of being sent to the scanning device 15.

Upon receipt of a system clock pulse, the write timing circuit 1*b* produes the write clock pulse X and the address designating signal Y, which in turn are conducted to the data buffer 36 through the switch 1*f* converted to a write mode. The timing circuit 1 further includes a display timing circuit 1*g* supplied with horizontal and vertical synchronizing signals. This display timing circuit 1*g* generates the readout clock pulse X for drawing out a video signal stored in the data buffer 36 at a speed adapted for the television reproducing device 37 and also the address designating signal Y. These signals X and Y are conducted to the data buffer 36 through the switch 1*f* converted to a display mode. As described above, the write timing circuit 1*b* controls the rate at which data is stored in the data buffer 36, in the timing of the inherent synchronizing signal of the ultrasonic wave receiver 6. The display timing circuit 1*g* causes data to be drawn out of the data buffer 36 in the timing of the inherent synchronizing signal of the television reproducing device 37. Changeover between the write and display modes is advisably effected by arranging the switch 1*f* to be shifted jointly with the changeover of the modes which takes place on a display panel (not shown).

The display timing circuit 1*g* generates a signal Z, which is transmitted to the line buffer 39 in the case of the display mode. This signal Z is intended to control a video output from the line buffer 39 for use in television display. The horizontal scanning lines of television are generally chosen to be 256. If, therefore, these are supposed to be 64 blocks N in the direction B of FIG. 7, it will be sufficient to allot 4 horizontal scanning lines to each of the 64 blocks. The signal Z is intended to cause video signals associated with the individual scanning lines which are temporarily stored in the line buffer 39 to be drawn out from the display timing circuit 1*g* at the rate of four per readout address designating signal.

Referring again to FIG. 1, the clock signal generated by the system clock signal generator 12 is applied to a horizontal synchronizing signal generator 41 and a vertical synchronizing signal generator 42 of a television circuit to supply the horizontal and vertical synchronizing signals to a horizontal driving circuit 43 and a vertical driving circuit 44, respectively and also to the timing circuit 1. In response to these horizontal and vertical synchronizing signals, the timing circuit 1 provides the data read out signal Z to the line buffer 39. The outputs from the horizontal and vertical driving circuits 43 and 44 are applied to a deflection device 45 to deflect an electron beam which has been subjected to a brightness modulation by the signal from the digital-analogue converter 40 in the horizontal and vertical directions on the display screen of the cathode ray tube 38 thereby displaying a B-scope picture image corresponding to the content of the memory device shown in FIG. 7.

As above described, all data concerning the tomographic pattern of the patient under examination and produced by a single scanning operation of the ultrasonic wave transducer 4 which extends from point P to point Q, are stored in the data buffer 36, and the stored data are readout for display on the cathode ray tube 38. Consequently, unless the data stored in the data buffer 36 are destroyed, the data are preserved for a long period and can be repeatedly displayed at any time. This is extremely effective and desirable for the diagnosis. Furthermore, only one scanning operation of the ultrasonic wave transducer 4 is sufficient, so that it is possible to reduce the time for the diagnosis without moving the patient, and the result of diagnosis is not influenced by the difference in the mechanical operations. Since the tones of the pictures displayed vary stepwisely from black to white through gray it is possible to display correctly and quantitatively the object as a clear image of high contrast.

Although in the embodiment shown in FIG. 1, the output from receiver 6 is derived out through detector 13 as an image signal, it is also possible to directly apply the output of the high frequency amplifier 9 upon the analogue-digital converter 22. Further, the detector 13 may be substituted with a low-pass filter.

Figure 10:
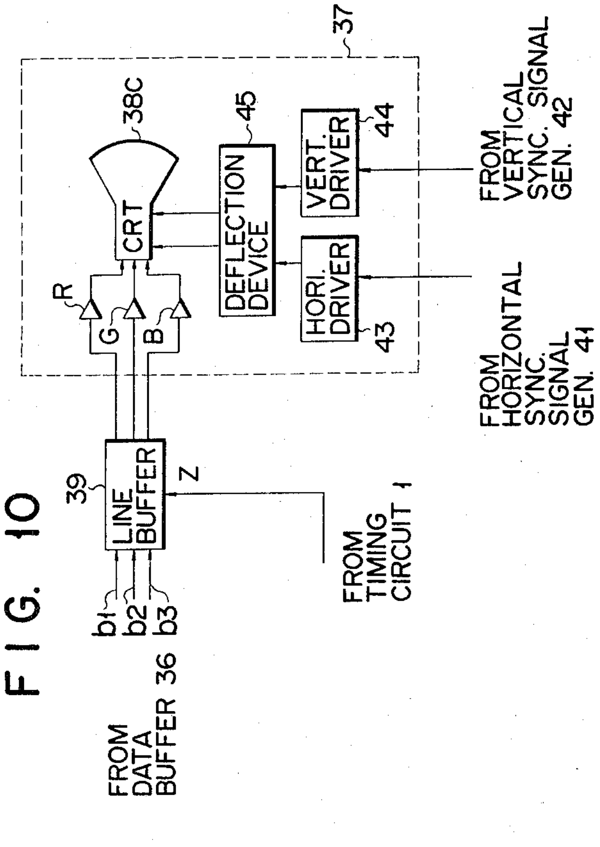
FIG. 10 is a block diagram showing the image display device of a modified embodiment of this invention.

Although in the embodiment shown in FIG. 1 a white and black television set was used to display pictures whose tones are varied in eight steps of from white to black through gray, it is also possible to display color pictures by supplying the three bit signals *b*1, *b*2 and *b*3 from the line buffer 39 to a color picture tube 38*c* through red, green and blue image amplifiers R, G and B, as shown in FIG. 10. In this embodiment, the state 0 or 1 of respective bits *b*1, *b*2 and *b*3 not only determine the luminescence of red, green and blue but also display intermediate colors. For example, in FIG. 4 the magnitudes of the bits *b*1, *b*2 and *b*3 are set such that where bits *b*1, *b*2 and *b*3 are 1, 0 and 1 respectively, magenta is displayed, where the bits are 0, 1 and 1, cyan is displayed, where the bits are 1, 1 and 0, yellow is displayed, where the bits are 1, 1 and 1 white is displayed, and where the bits are 0, 0 and 0 black is displayed.

Figure 11:
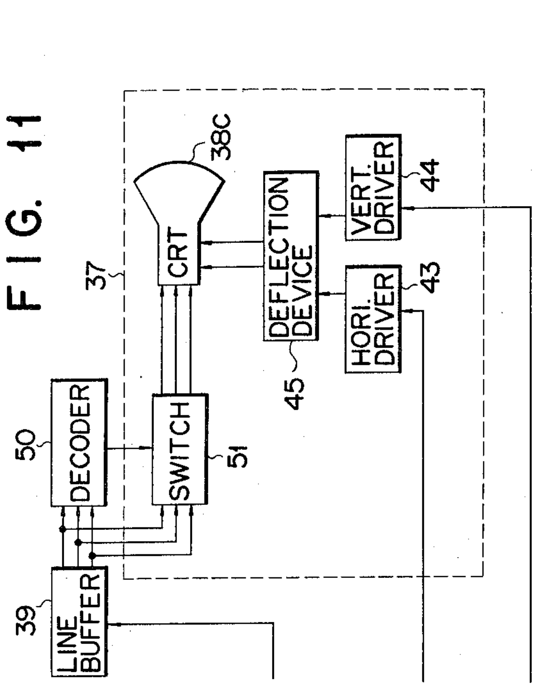
FIG. 11 is a block diagram showing a modified image display device.
Figure 12:
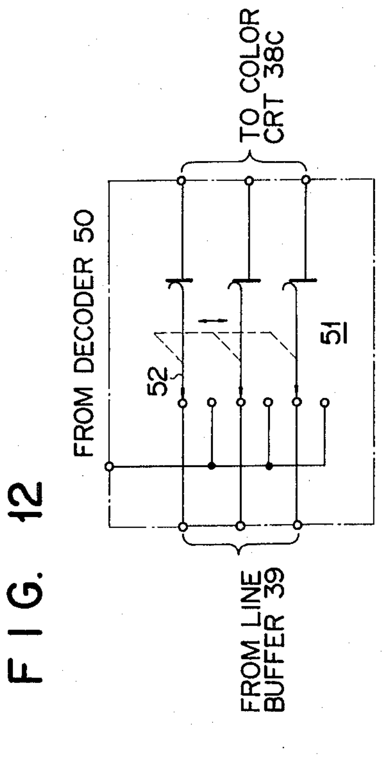
FIG. 12 shows the construction of the transfer switch utilized in the circuit shown in FIG. 11.

FIG. 11 shows another embodiment which enables, when desired, to display white and black pictures of varied tones on the color picture tube 38*c* shown in FIG. 10. Normally, the three digital bit signals *b*1, *b*2 and *b*3 from the line buffer 39 are applied to color picture tube 38*c* via a transfer switch 51 to display color pictures as has been described in connection with FIG. 10. When the transfer switch 51 is thrown to the side of a decoder 50, three types of signals having magnitudes determined by the combinations of three bit digital signals *b*1, *b*2 and *b*3 are sent to the electron guns of the color picture tube 38*c* from decoder 50 so as to display white and black pictures whose tones are varied in eight steps on the display screen of the color picture tube 38*c*. The transfer switch 51 may have a construction as shown in FIG. 12 and includes a switch element 52.

Figure 13:
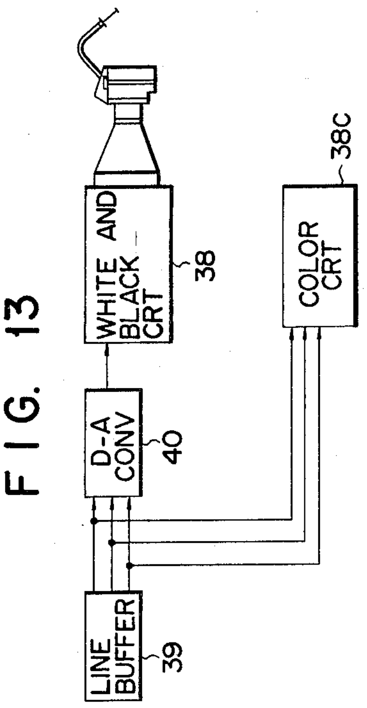
FIG. 13 is a block diagram of still another example of the image display device.

In a modification shown in FIG. 13, both white and black picture tube 38 and color picture tube 38*c* are used for simultaneously displaying a white and black picture and a color picture. The outputs from the line buffer 39 are applied to the white and black picture tube 38 via the digital-analogue converter 40 in a manner similar to FIG. 1, and also applied directly to the color picture tube 38*c*.

In the foregoing description, it was assumed that pulse generator 2 shown in FIG. 1 provides an output of a definite frequency (hence, pulse generator 34 also provides an output of a definite frequency) and that the scanning range extends from point P to point Q shown in FIG. 2. With this arrangement, however, as the scanning range is fixed, it is impossible to make fine diagnosis in a wider or narrower ranger. However, such disadvantage can be overcome by adding a plurality of trigger signal sources of different frequences to the timing circuit 1 as shown in FIG. 9 and by selectively connecting to the pulse generator 2 a trigger signal source having a desired frequency. As can be noted from the circuit construction shown in FIG. 1, since the outputs of pulse generators 34 and 2 have a definite frequency relationship, it is possible to magnify or reduce the scanning ranges in the directions A and B (see FIG. 2) at the same ratio thereby providing the same magnifying and reducing functions to that of the zoom lens utilized in a photographic camera.

For example, assume that the scanning or diagnosis ranges in the directions A and B (see FIG. 2) are reduced to one half, respectively. Firstly, with respect to direction A, while the transducer 4 scans a range A/2, the pulse generator 2 is required to produce M pulses for transmitting the ultrasonic wave for M times. Assuming that the speed of travel of the transducer 4 is not varied, it is necessary to double the frequency of the output pulse from the pulse generator 2. In the same manner, with respect to direction B, it is also necessary to divide the range B/2 by N pulses. However, since the frequency of the pulse sent to pulse generator 34 from pulse generator 2 has been doubled, the output frequency of the pulse generator 34 will be increased to 2N. For this reason, it is necessary to reduce the frequency of the input pulse to one half by the pulse generator 34. Then the image of the one-fourth area will be displayed on the same screen of the picture tube whereby the picture is magnified by a factor of 4 thus enabling a fine and accurate diagnosis.

What is claimed is:

1. In ultrasonic diagnostic apparatus of the type including an ultrasonic wave transducer for transmitting an ultransonic wave toward an object to be examined and for converting the ultrasonic wave reflected by said object into an electric signal; and television means responsive to the electric signal for displaying the image of said object;

the improvement comprising:

means for energizing said ultrasonic wave transducer;

means for moving said transducer along said object;

means for producing a position signal representing the position of said transducer;

said means for energizing said ultrasonic wave transducer including a first pulse generator for generating a pulse signal in response to said position signal, means driven by the output pulse from said first pulse generator for forming an ultrasonic oscillation signal, and means for applying said ultrasonic oscillation signal to said ultrasonic wave transducer;

a receiver for receiving the output signal from said transducer;

an analogue-digital converter for converting an analogue output from said receiver into a digital signal;

a data buffer means for storing the output from said converter;

a line buffer means for temporarily storing line data of the quantity corresponding to one horizontal scanning line of a television set, said line data being read out from said data buffer means;

means for converting the output signal from said line buffer means into a signal suitable to be displayed on said televison means; and said television means including television display means responsive to the output from said signal converting means for displaying the image of said object.

2. The ultrasonic diagnostic apparatus according to claim 1 wherein said receiver comprises a preamplifier for amplifying the output signal from said ultrasonic wave transducer, a gain control unit for controlling the gain of said preamplifier, a time gain control unit for controlling the operation of said gain control unit, a high frequency amplifier for amplifying the output from said preamplifier, and means to detect the output from said high frequency amplifier for deriving out an image signal.

3. The ultrasonic diagnostic apparatus according to claim 2 wherein said data buffer means comprises a delay circuit for delaying the pulse signal from said first pulse generator for a predetermined period of time, a second pulse generator operated by the output from said delay circuit, an AND gate circuit connected to receive the output from said second pulse generator as a gate signal for sampling the output from said analogue-digital converter, and a data buffer memory for sucessively storing the outputs from said AND gate circuit in predetermined addresses in accordance with the movement of said transducer.

4. The ultrasonic diagnostic apparatus according to claim 1 wherein said means for moving said ultrasonic wave transducer along said object comprises a threaded feed rod disposed along one side of said object, an internally threaded support engaging said feed rod to be moved therealong, said support supporting said transducer; and wherein said means for producing said position signal comprises a contact piece carried by said support, and a plurality of contacts disposed along said feed rod to be successively engaged by said contact piece as said transducer is moved, thereby producing position signals.

5. The ultrasonic diagnostic apparatus according to claim 1 wherein said analogue-digital converter comprises a plurality of signal slicers for dividing the image signal produced by said receiver into a plurality of signals in response to the level of said image signal, a plurality of waveform shaping circuits for shaping the waveforms of the output signals from said signal slicers, and a matrix circuit connected to receive the outputs from the respective waveform shaping circuits for providing a digital output of a predetermined number of bits corresponding to said outputs from the respective waveform shaping circuits.

6. The ultrasonic diagnostic apparatus according to claim 5 wherein said analogue-digital converter produces three bit digital image signals and said television display means comprises a color picture tube having three electron guns connected to receive said three bit digital image signals respectively.

7. The ultrasonic diagnostic apparatus according to claim 1 wherein said data buffer means comprises a delay circuit for delaying the pulse signal from said first pulse generator for a predetermined period of time, a second pulse generator operated by the output from said delay circuit, an AND gate circuit connected to receive the output from said second pulse generator as a gate signal for sampling the output from said analogue-digital converter, and a data buffer memory for successively storing the outputs from said AND gate circuit in the predetermined addresses in accordance with the movement of said transducer.

8. The ultrasonic diagnostic apparatus according to claim 7 wherein said delay circuit is a variable delay circuit.

9. The ultrasonic diagnostic apparatus according to claim 7 wherein the output frequencies of said first and second pulse generators are variable.

10. The ultrasonic diagnostic apparatus according to claim 1 wherein said image display device comprises a black and white television receiver.

11. The ultrasonic diagnostic apparatus according to claim 1 including a further digital-analogue converter for converting the output from a line buffer means into an analogue signal, said converter supplying to said image display apparatus an image signal whose tone varies stepwisely from white to black.

12. The ultrasonic diagnostic apparatus according to claim 1 wherein said analogue-digital converter produces three bit digital image signals and said television display means comprises a color picture tube having three electron guns connected to receive said three bit digital image signals respectively.

13. The ultrasonic diagnostic apparatus according to claim 12 wherein said television display means further includes a decoder to decode said three bit digital image signals to display a black and white tone picture on said color picture tube and switch means for selectively supplying the output from said decoder and the output from said line buffer means to said color picture tube.

14. The ultrasonic diagnostic apparatus according to claim 1 including an additional digital-analogue converter for converting the output from the line buffer means into a black and white tone picture signal, and said television display means includes a black and white picture tube for displaying a black and white picture in response to the output from said additional digital-analogue converter.

15. The ultrasonic diagnostic apparatus according to claim 1 wherein each of said data buffer means and line buffer means comprises a circulating memory device in the form of a dynamic shift register provided with a feedback loop.

16. The ultrasonic diagnostic apparatus according to claim 1 which further comprises a system clock signal generator; and a timing circuit including a frequency divider for dividing the frequency of a system clock signal delivered from said system clock signal generator, means for transmitting an output from the frequency divider to the first pulse generator as a trigger signal, a counter for counting the prescribed number of outputs from the frequency divider, a start-stop signal generator for supplying a scanning device with stop-start signals for controlling the operation of the scanning device upon receipt of an output from the counter, a write timing circuit for generating a write clock signal and an address designating signal upon receipt of the system clock signal, means for producing horizontal and vertical synchronizing signals of television upon receipt of the system clock signal, a display timing circuit for giving forth a readout clock signal and an address designating signal upon receipt of the horizontal and vertical synchronizing signals, and a mode changing switch for selectively supplying the data buffer means with a write clock signal and an address-designating signal delivered from the write timing circuit and a readout clock signal and an address-designating signal conducted from the display timing circuit.

17. The ultrasonic diagnostic apparatus according to claim 1 which further comprises a system clock signal generator; and a timing circuit including a frequency divider for dividing the frequency of a system clock signal delivered from said system clock signal generator, means for transmitting an output from the frequency divider to the first pulse generator as a trigger signal, a counter for counting the prescribed number of outputs from the frequency divider, a start-stop signal generator for supplying a scanning device with stop-start signals for controlling the operation of the scanning device upon receipt of an output from the counter, a write timing circuit for generating a write clock signal and an address designating signal upon receipt of the system clock signal, means for producing horizontal and vertical synchronizing signals of television upon receipt of the system clock signal, a display timing circuit for giving forth a readout clock signal and an address designating signal upon receipt of the horizontal and vertical synchronizing signals, and a mode changing switch for selectively supplying the data buffer means with a write clock signal and an address-designating signal delivered from the write timing circuit and a readout clock signal and an address-designating signal conducted from the display timing circuit.

18. The ultrasonic diagnostic apparatus according to claim 17 wherein said receiver comprises a preamplifier for amplifying the output signal from said ultrasonic wave transducer, a gain control unit for controlling the gain of said preamplifier, a time gain control unit for controlling the operation of said gain control unit, a high frequency amplifier for amplifying the output from said preamplifier, and means to detect the output from said high frequency amplifier for deriving out an image signal.

19. In ultrasonic diagnostic apparatus of the type including an ultrasonic wave transducer for transmitting an ultrasonic wave toward an object to be examined and for converting the ultrasonic wave reflected by said object into an electric signal; and television means responsive to the electric signal for displaying the image of said object;

the improvement comprising:

means for energizing said ultrasonic wave transducer;

means for moving said transducer along said object;

means for producing a position signal representing the position of said transducer;

a receiver for receiving the output signal from said transducer, said receiver including a preamplifier for amplifying the output signal from said ultrasonic wave transducer, a gain control unit for controlling the gain of said preamplifier, a time gain control unit for controlling the operation of said gain control unit, a high frequency amplifier for amplifying the output from said preamplifier, and means to detect the output from said high frequency amplifier for deriving out an image signal;

an analogue-digital converter for converting an analogue output from said receiver into a digital signal;

a data buffer means for storing the output from said converter;

a line buffer means for temporarily storing line data of the quantity corresponding to one horizontal scanning line of a television set, said line data being read out from said data buffer means;

means for converting the output signal from said line buffer means into a signal suitable to be displayed on said television means; and said television means including television display means responsive to the output from said signal converting means for displaying the image of said object.

20. The ultrasonic diagnostic apparatus according to claim 19 wherein said means for moving said ultrasonic wave transducer along said object comprises a threaded feed rod disposed along one side of said object, an internally threaded support engaging said feed rod to be moved therealong, said support supporting said transducer; and wherein said means for producing said position signal comprises a contact piece carried by said support, and a plurality of contacts disposed along said feed rod to be successively engaged by said contact piece as said transducer is moved, thereby producing position signals.

21. The ultrasonic diagnostic apparatus according to claim 19 wherein said analogue-digital converter comprises a plurality of signal slicers for dividing the image signal produced by said receiver into a plurality of signals in response to the level of said image signal, a plurality of waveform shaping circuits for shaping the waveforms of the output signals from said signal slicers, and a matrix circuit connected to receive the outputs from the respective waveform shaping circuits for providing a digital output of a predetermined number of bits corresponding to said outputs from the respective waveform shaping circuits.

22. The ultrasonic diagnostic apparatus according to claim 19 including a further digital-analogue converter for converting the output from said line buffer means into an analogue signal, said converter supplying to said image display apparatus an image signal whose tone varies stepwisely from white to black.

23. The ultrasonic diagnostic apparatus according to claim 19 wherein said analogue-digital converter produces three bit digital image signals and said television display means comprises a color picture tube having three electron guns connected to receive said three bit digital image signals respectively.

24. The ultrasonic diagnostic apparatus according to claim 23 wherein said television display means further includes a decoder to decode said three bit digital image signals to display a black and white tone picture on said color picture tube and switch means for selectively supplying the output from said decoder and the output from said line buffer means to said color picture tube.

25. In ultrasonic diagnostic apparatus of the type including an ultrasonic wave transducer for transmitting an ultrasonic wave toward an object to be examined and for converting the ultrasonic wave reflected by said object into an electric signal; and television means responsive to the electric signal for displaying the image of said object;

the improvement comprising:

means for energizing said ultrasonic wave transducer;

means for moving said transducer along said object, said moving means comprising a threaded feed rod disposed along one side of said object, and an internally threaded support engaging said feed rod to be moved therealong, said support supporting said transducer;

means for producing a position signal representing the position of said transducer, said means for producing said position signal comprising a contact piece carried by said support, and a plurality of contacts disposed along said feed rod to be successively engaged by said contact piece as said transducer is moved, thereby producing position signals;

a receiver for receiving the output signal from said transducer;

an analogue-digital converter for converting an analogue output from said receiver into a digital signal;

a data buffer means for storing the output from said converter;

a line buffer means for temporarily storing line data of the quantity corresponding to one horizontal scanning line of a television set, said line data being read out from said data buffer means;

means for converting the output signal from said line buffer means into a signal suitable to be displayed on said television means; and said television means including television display means responsive to the output from said signal converting means for displaying the image of said object.

26. The ultrasonic diagnostic apparatus according to claim 25 wherein said means for energizing said ultrasonic wave transducer comprises a first pulse generator for generating a pulse signal in response to said position signal, means driven by the output pulse from said first pulse generator for forming an ultrasonic oscillation signal, and means for applying said ultrasonic oscillation signal to said ultrasonic wave transducer; and wherein said receiver comprises a preamplifier for amplifying the output signal from said ultrasonic wave transducer, a gain control unit for controlling the gain of said preamplifier, a time gain control unit for controlling the operation of said gain control unit, a high frequency amplifier for amplifying the output from said preamplifier, and means to detect the output from said high frequency amplifier for deriving out an image signal.

27. The ultrasonic diagnostic apparatus according to claim 25 wherein said analogue-digital converter comprises a plurality of signal slicers for dividing the image signal produced by said receiver into a plurality of signals in responsive to the level of said image signal, a plurality of waveform shaping circuits for shaping the waveforms of the output signals from said signal slicers, and a matrix circuit connected to receive the outputs from the respective waveform shaping circuits for providing a digital output of a predetermined number of bits corresponding to said outputs from the respective waveform shaping circuits.

28. The ultrasonic diagnostic apparatus according to claim 25 including a further digital-analogue converter for converting the output from said line buffer means into an analogue signal, said converter supplying to said image display apparatus an image signal whose tone varies stepwisely from white to black.

29. The ultrasonic diagnostic apparatus according to claim 25 wherein said analogue-digital converter produces three bit digital image signals and said television display means comprises s color picture tube having three electron guns connected to receive said three bit digital image signals respectively.

30. The ultrasonic diagnostic apparatus according to claim 29 wherein said television display means further includes a decoder to decode said three bit digital image signals to display a black and white tone picture on said color picture tube and switch means for selectively supplying the output from said decoder and the output from said line buffer means to said color picture tube.

31. In ultrasonic diagnostic apparatus of the type including an ultrasonic wave transducer for transmitting an ultrasonic wave toward an object to be examined and for converting the ultrasonic wave reflected by said object into an electric signal; and television means responsive to the electric signal for displaying the image of said object;

the improvement comprising:

means for energizing said ultrasonic wave transducer;

means for producing a position signal representing the position of said transducer;

a receiver for receiving the output signal from said transducer;

an analogue-digital converter for converting an analogue output from said receiver into a digital signal, said analogue-digital converter comprising a plurality of signal slicers for dividing the image signal produced by said receiver into a plurality of signals in response to the level of said image signal, a plurality of waveform shaping circuits for shaping the waveforms of the output signals from said signal slicers, and a matrix circuit connected to receive the outputs from the respective waveform shaping circuits for providing a digital output of a predetermined number of bits corresponding to said outputs from the respective waveform shaping circuits;

a data buffer means for storing the output from said converter;

a line buffer means for temporarily storing line data of the quantity corresponding to one horizontal scanning line of a television set, said line data being read out from said data buffer means;

means for converting the output signal from said line buffer means into a signal suitable to be displayed on said television means; and said television means including television display means responsive to the output from said signal converting means for displaying the image of said object.

32. The ultrasonic diagnostic apparatus according to claim 31 including a further digital-analogue converter for converting the output from said line buffer means into an analogue signal, said converter supplying to said image display apparatus an image signal whose tone varies stepwisely from white to black.

33. The ultrasonic diagnostic apparatus according to claim 31 wherein said analogue-digital converter produces three bit digital image signals and said television display means comprises a color picture tube having three electron guns connected to receive said three bit digital image signals respectively.

34. The ultrasonic diagnostic apparatus according to claim 33 wherein said television display means further includes a decoder to decode said three bit digital image signals to display a black and white tone picture on said color picture tube and switch means for selectively supplying the output from said decoder and the output from said line buffer means to said color picture tube.

35. In ultrasonic diagnostic apparatus of the type including an ultrasonic wave transducer for transmitting an ultrasonic wave toward an object to be examined and for converting the ultrasonic wave reflected by said object into an electric signal; and television means responsive to the electric signal for displaying the image of said object;

the improvement comprising:

means for energizing said ultrasonic wave transducer;

means for moving said transducer along said object;

means for producing a position signal representing the position of said transducer;

a receiver for receiving the output signal from said transducer;

an analogue-digital converter for converting an analogue output from said receiver into a digital signal, said analogue-digital converter includes means for producing three bit digital image signals;

a data buffer means for storing the output from said converter;

a line buffer means for temporarily storing line data of the quantity corresponding to one horizontal scanning line of a television set, said line data being read out from said data buffer means;

means for converting the output signal from said line buffer means into a signal suitable to be displayed on said television means; and said television means including television dispay means having a color picture tube with three electron guns connected to respectively receive said three bit digital image signals, and being responsive to the output from said signal converting means for displaying the image of said object.

36. The ultrasonic diagnostic apparatus according to claim 35 wherein said television display means further includes a decoder to decode said three bit digital image signals to display a black and white tone picture on said color picture tube and switch means for selectively supplying the output from said decoder and the output from said line buffer means to said color picture tube.

* * * * *